United States Patent Office 3,379,703
Patented Apr. 23, 1968

3,379,703
PROCESS FOR PREPARING POLYVINYL ALCOHOL
IN THE PRESENCE OF DIALDEHYDES
Werner Ehmann and Siegfried Sommer, Frankfurt am Main, and Fritz Winkler, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Dec. 15, 1964, Ser. No. 418,548
Claims priority, application Germany, Dec. 17, 1963, F 41,564
6 Claims. (Cl. 260—91.3)

The present invention provides a process for preparing polyvinyl alcohol.

Polyvinyl alcohol is obtained with the use of alkaline or acid catalysts by alcoholysis of polyvinyl esters, particularly of polyvinyl acetate in an aliphatic alcohol. There is generally used a methanolic solution of the polyvinyl ester from which the polyvinyl alcohol formed by alcoholysis is separated. Consequently, this process is partly carried out in a heterogeneous system. When the alcoholysis is executed with the use of an acid catalyst, it is also possible to carry out the whole reaction in a homogeneous phase by using a solvent mixture capable of dissolving the polyvinyl ester and the polyvinyl alcohol. It is also possible to carry out a homogeneous alcoholysis by modifying the solvent during the reaction by continuously increasing, for example, the contents of water in the reaction medium. It is known that a polyvinyl alcohol prepared according to this method is a very unitary substance in the physical and in the chemical sense, and is particularly appropriate for certain purposes.

In certain cases it is necessary to use very highly viscous polyvinyl alcohols. They are generally prepared by saponifying a high-molecular weight polyvinyl ester obtained by polymerization of the vinyl ester with the use of small quantities of catalyst. The polymerization is very slow; generally it is not terminated in order to assure a slight degradation of the polyvinyl ester caused by saponification. Both process steps considerably increase the costs of producing of a high-molecular weight polyvinyl alcohol.

It is known to cross-link polyvinyl alcohol with glyoxal in order to increase the viscosity of a solution of the polyvinyl alcohol. The reaction, is, however, slow and a very small quantity only of the glyoxal used reacts with the polyvinyl alcohol.

The present invention is based on the observation that a polyvinyl alcohol having good protective-colloid properties and giving a relatively highly viscous solution when dissolved in water, can be prepared by using, during the acid alcoholysis or hydrolysis of the polymers of esters of vinyl alcohol and a monocarboxylic acid, particularly of an aliphatic saturated monocarboxylic acid having 1 to 18 carbon atoms such as polyvinyl formate, polyvinyl propionate, polyvinyl butyrate, polyvinyl stearate, preferably polyvinyl acetate, small quantities, for example 0.01 to 0.3%, preferably 0.01 to 0.1% (calculated on the polyvinyl ester) of a dialdehyde, the aldehyde groups of which are separate by at least one carbon atom. Dialdehydes of this kind are for example propane dial, butane dial, pentane dial, hexane dial, phthalic aldehyde, isophthalic aldehyde, diphenyl dial-4,4', preferably terephthalic aldehyde and/or cyclohexane dial-1,4. The reaction of polyvinyl alcohol with these aldehydes is rapid and quantitative.

The polyvinyl ester, preferably polyvinyl acetate, subjected to hydrolysis or alcoholysis can be obtained by polymerization in bulk, in solution, in suspension or in emulsion. The alcoholysis is preferably carried out by using monovalent saturated aliphatic alcohols having 1 to 4 carbon atoms, preferably methanol. Before alcoholysis or hydrolysis the polyvinyl ester is dissolved or suspended in the aliphatic alcohol or in the mixture of aliphatic alcohol and water, the ratio by weight of the polyvinyl ester to the liquid phase being within the range of from 10 to 90 and 90 to 10, preferably from 20 to 80 and 70 to 30. There are preferably used as saponification catalysts strong acids, for example sulfuric acid, hydrochloric acid, sulfo acids and particularly perchloric acid. They are applied in quantities of 0.1 to 3%, preferably 0.3 to 2% calculated on the weight of the polyvinyl ester. There are generally applied reaction temperatures between 40 and 130° C. According to the process of the present invention it is possible to completely saponify polyvinyl ester to polyvinyl alcohol. By adding for example a certain quantity of water, by using relatively small amounts of acid catalyst, by adjusting a certain reaction temperature or by neutralizing the acid catalyst at a certain moment, it is also possible to carry out the reaction in a manner such that partly saponified polyvinyl esters are formed in which at least 50% of the ester groups which have been present in the initial polyvinyl ester are converted to hydroxyl groups.

In any case there are obtained polyvinyl alcohols of high viscosity the aqueous solution of which has a higher viscosity than a solution having the same concentration of a polyvinyl alcohol prepared under otherwise the same conditions but in the absence of a dialdehyde. When operating according to the present process it is not necessary, therefore, to carry out the customary process steps which make the product more expensive. Solutions of polyvinyl alcohol frequently are used for preparing polyvinyl ester dispersions and other dispersions of plastics. In the special case, when polyvinyl ester dispersions are to be used as glue, it is necessary that the glued joints prepared by means of the dispersions do not undergo deformation at all or only to as small an extent as possible when they are exposed to stretching strain under heat. It has been shown that the characteristics of the polyvinyl alcohol used for preparing dispersions which serve to make glued joints is of decisive importance for avoiding deformation of the glued joints.

Frequently it may be advantageous to carry out the reaction in an atmosphere of inert gas, for example of nitrogen or a noble gas.

By following a preferred method of carrying out the process of the present invention polyvinyl alcohols are obtainable that are suitable for the preparation of polyvinyl ester dispersions complying with the above-mentioned condition that glued joints prepared by means of the dispersions must not undergo deformation. It is particularly advantageous to prepare the polyvinyl alcohol by starting using polyvinyl acetate solution in methanol containing 30 to 70% of polyvinyl acetate. Perchloric acid has proved advantageous as catalyst. Temperatures within the range of from 70 to 120° C. are applied, and the reaction is carried out under the pressure of the solvent or under the additional pressure of an inert gas within the range of from 1 to 5 atmospheres. During alcoholysis or hydrolysis, at least one of the dialdehydes previously identified, and 5 to 45% water, calculated on the weight of the polyvinyl acetate, are present. The temperature is adjusted in a manner such that at least during the saponification of the first half of the acetyl groups, the reaction is carried out in the homogeneous system. During the saponification of the second half of the acetyl groups, the polyvinyl alcohol can separate from the mixture as a pasty second phase. The methyl acetate formed is removed only when the saponification is terminated. The perchloric acid is neutralized, for example with sodium hydroxide, when the polyvinyl alcohol contains 4 to 25%, preferably 7 to 23%, of residual acetyl groups. The reaction mass is subsequently treated by distilling off the solvent, if desired by blowing in water vapor.

The following examples serve to illustrate the invention but they are not intended to limit it thereto.

Example 1

275 grams methanolic solution of 20% strength of a polyvinyl acetate having a K-value of 65 measured as solution of 1% strength in ethyl acetate at 20° C., 27 milligrams cyclohexane dial-1,4 and 2 grams sulfuric acid of 80% strength were heated under reflux for 15 hours in a glass vessel holding 1 liter provided with an anchor agitator, a reflux condenser and a heating jacket. The polyvinyl alcohol which had precipitated was filtered off and washed neutral with methanol. Its residual acetyl content was 1.3%. The viscosity of an aqueous solution of 10% strength at 20° C. was 23 poises, measured in the Höppler viscosimeter.

When the saponification was carried out according to the same process but without the addition of cyclohexane dial-1,4 the viscosity of the aqueous solution of 10% strength of the polyvinyl alcohol obtained was only 7 poises.

Example 2

200 grams of a polyvinyl acetate having a K-value of 65 were dissolved in 300 grams methanol, 30 grams water, 1 gram perchloric acid (calculated on 100%) and 100 milligrams terephthalic aldehyde were added to the solution. The mixture was heated to 80° C. in a stirring autoclave. After about 10 hours the solution, which was first clear, became turbid. Samples were taken and diluted with water to 1% strength. When these solutions did not become turbid on boiling, the perchloric acid was neutralized with the calculated amount of the aqueous 3 N sodium hydroxide solution, the mixture was diluted with 100 cc. water and subsequently the polyvinyl solution was freed from methanol and methyl acetate by distillation with steam. The polyvinyl alcohol solution containing 10% of solid product had a viscosity of 27 poises. The residual acetyl content of the polyvinyl alcohol was 11%, the K-value measured as solution of 1% strength in water at 20° C. was 80 (K-value according to Fikentscher, Cellulosechemie, vol. 13, page 58 (1932)).

In a comparison test, polyvinyl alcohol was prepared as described in the preceding paragraph, but without terephthalate aldehyde. This polyvinyl alcohol, too, had a residual acetyl content of 11%. Its K-value was, however, 68 and the viscosity of the aqueous solution of 10% strength was 8 poises.

Example 3

300 grams polyvinyl acetate having a K-value of 42 were dissolved in 200 grams methanol, 2.25 grams perchloric acid (calculated on 100%), 30 grams water and 240 milligrams terephthalic aldehyde were added. The mixture was heated to 90° C. in a stirring autoclave. After about 8 hours the polyvinyl alcohol began to precipitate as a grey, pasty mass. When the aqueous solution of 1% strength was not turbid, the perchloric acid was neutralized with the calculated amount of aqueous sodium hydroxide solution, diluted with 150 cc. water, and methanol and methyl acetate were distilled off with steam. The aqueous solution of polyvinyl alcohol diluted to 10% strength had a viscosity of 43 centipoises. The K-value of the polyvinyl alcohol was 44, the residual acetyl content was 15%.

In a comparative test, polyvinyl alcohol was prepared in the way described in the last paragraph, but without terephthalic aldehyde. The residual acetyl content of the polyvinyl alcohol obtained was also 15%, the K-value was, however, 37 and the viscosity of the aqueous solution of 10% strength was 28 centipoises.

We claim:

1. In a process for the production of polyvinyl alcohol by acid hydrolysis of a polymeric polyvinyl ester wherein the acid moiety is derived from a saturated monocarboxylic acid having 1 to 18 carbon atoms, the improvement which comprises carrying out the hydrolysis in the presence of 0.01 to 0.3%, calculated on the weight of said polymer, of a dialdehyde the aldehyde groups of which are separated by at least one carbon atom selected from the group consisting of saturated hydrocarbon, aromatic or alicyclic dials having from 3 to 14 carbon atoms.

2. The process of claim 1 wherein the dialdehyde is a member selected from the group consisting of propane dial, butane dial, pentane dial, hexane dial, phthalic aldehyde, isophthalic aldehyde, diphenyl dial-1,4, terephthalic aldehyde and cyclohexane dial-1,4.

3. A process for the production of a partly saponified polyvinyl ester in which at least 50% of the ester groups of the initial polyvinyl ester are converted to hydroxyl groups by acid hydrolysis the polymeric polyvinyl ester wherein the acid moiety is derived from a saturated monocarboxylic acid having 1 to 18 carbon atoms to acid hydrolysis in the presence of 0.01 to 0.3%, calculated on the weight of said polymer, of a dialdehyde the aldehyde groups of which are separated by at least one carbon atom selected from the group consisting of saturated hydrocarbon, aromatic or alicyclic dials having from 3 to 14 carbon atoms.

4. In a process for acid hydrolysis of polyvinyl acetate the improvement which comprises carrying out the hydrolysis in the presence of 0.01 to 0.3% by weight, calculated on the weight of polymer, of a dialdehyde selected from the group consisting of propane dial, butane dial, pentane dial, hexane dial, phthalic aldehyde, isophthalic aldehyde, diphenyl dial-1,4, terephthalic aldehyde and cyclohexane dial-1,4.

5. A process for the preparation of a water-soluble polyvinyl alcohol which comprises subjecting a polymeric polyvinyl ester wherein the acid moiety is derived from an aliphatic saturated monocarboxylic acid having 1 to 18 carbon atoms to acid hydrolysis at a temperature between 40 and 130° C. in a monohydric saturated aliphatic alcohol having 1 to 4 carbon atoms or a mixture thereof with water and in the presence of 0.1 to 3% by weight of a strong inorganic acid and 0.1 to 0.3% by weight of a dialdehyde, the aldehyde groups of which are separated by at least one carbon atom saturated hydrocarbon, aromatic or alicyclic dials having from 3 to 14 carbon atoms.

6. A product prepared according to the process of claim 2.

References Cited

UNITED STATES PATENTS

| | | | |
|---|---|---|---|
| 3,100,199 | 8/1963 | Fordham et al. | 260—91.3 |
| 2,109,883 | 3/1938 | Herrmann et al. | 260—73 |
| 2,327,872 | 8/1943 | Dahle | 260—73 |
| 3,080,207 | 3/1963 | Tanabe et al. | 260—73 |

OTHER REFERENCES

Yoshida, Chem. Abs., 44 (1950), page 2273bc.

JOSEPH L. SCHOFER, *Primary Examiner.*

J. F. McNALLY, H. WONG, JR., *Assistant Examiners.*